US009493952B2

(12) United States Patent
Kalkanoglu

(10) Patent No.: US 9,493,952 B2
(45) Date of Patent: Nov. 15, 2016

(54) ROOFING TILE WITH WEATHER DURABLE COLORING MATTER

(75) Inventor: Husnu Kalkanoglu, Swarthmore, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 917 days.

(21) Appl. No.: 11/759,582

(22) Filed: Jun. 7, 2007

(65) Prior Publication Data

US 2008/0302050 A1    Dec. 11, 2008

(51) Int. Cl.
  *B32B 41/00* (2006.01)
  *E04D 1/20* (2006.01)
  *B29C 44/12* (2006.01)
  (Continued)

(52) U.S. Cl.
  CPC ........... *E04D 1/205* (2013.01); *B29C 44/1271* (2013.01); *B29C 47/046* (2013.01); *B29C 51/24* (2013.01); *B29C 47/003* (2013.01); *B29C 47/004* (2013.01); *B29C 47/0021* (2013.01); *B29C 47/0033* (2013.01); *B29C 47/0038* (2013.01); *B29C 47/0066* (2013.01); *B29C 47/0069* (2013.01); *B29C 47/043* (2013.01); *B29C 47/92* (2013.01); *B29C 51/10* (2013.01); *B29C 2791/001* (2013.01); *B29C 2791/006* (2013.01); *B29C 2795/002* (2013.01); *B29C 2947/9258* (2013.01); *B29C 2947/92647* (2013.01); *B29C 2947/92904* (2013.01); *B29K 2995/0072* (2013.01); *B29L 2031/104* (2013.01); *B29L 2031/108* (2013.01)

(58) Field of Classification Search
  CPC ............. B28B 11/04; B29C 2791/001; B29C 2791/006; B29C 44/3403; B29C 47/00; B29C 51/10

USPC ................. 264/73, 74, 176.1, 177.1, 177.17, 264/210.1, 210.3, 211.12; 156/64, 350

See application file for complete search history.

(56) References Cited

U.S. PATENT DOCUMENTS 2,983,962 A    5/1961   Merz et al.
3,605,360 A    9/1971   Merrill et al.
(Continued)

FOREIGN PATENT DOCUMENTS

JP    62174136 A    7/1987
JP    05169520 H    7/1993
(Continued)

OTHER PUBLICATIONS

International Search Report dated Dec. 4, 2008 in PCT/US2008/066099.

(Continued)

*Primary Examiner* — Michael N Orlando
*Assistant Examiner* — Joshel Rivera
(74) *Attorney, Agent, or Firm* — Alexander H. Plache; Abel Law Group, LLP

(57) ABSTRACT

A synthetic roofing material for a roofing tile and a method of extruding a resinous polymeric precursor of an exterior polymeric sheet for one or more roofing tiles; and applying a weather durable coloring matter on a surface of the precursor, wherein the cooling matter comprises one or more pigment colors in a variegated surface coloration pattern, which simulates a distinctive coloration of a natural material. The precursor is impressed with surface topography features and a surface roughness that simulate the surface features of the natural material.

12 Claims, 4 Drawing Sheets

(51) Int. Cl.

| | |
|---|---|
| B29C 51/24 | (2006.01) |
| B29C 47/00 | (2006.01) |
| B29C 47/04 | (2006.01) |
| B29C 47/92 | (2006.01) |
| B29C 51/10 | (2006.01) |
| B29L 31/10 | (2006.01) |

(56) References Cited

U.S. PATENT DOCUMENTS

| | | | |
|---|---|---|---|
| 3,774,428 A * | 11/1973 | Derry et al. | 72/46 |
| 3,830,687 A | 8/1974 | Re et al. | |
| 3,852,934 A | 12/1974 | Kirkhuff | |
| 3,868,300 A | 2/1975 | Wheeler | |
| 3,887,410 A | 6/1975 | Lindner | |
| 3,895,087 A | 7/1975 | Ottinger et al. | |
| 3,897,667 A | 8/1975 | Turek | |
| 3,936,518 A | 2/1976 | Soda et al. | |
| 3,970,732 A * | 7/1976 | Slaats et al. | 264/40.5 |
| 4,034,528 A | 7/1977 | Sanders et al. | |
| 4,065,899 A | 1/1978 | Kirkhuff | |
| 4,141,944 A | 2/1979 | Anstadt et al. | |
| 4,191,722 A | 3/1980 | Gould | |
| 4,279,106 A | 7/1981 | Gleason et al. | |
| 4,290,248 A | 9/1981 | Kemerer et al. | |
| 4,356,216 A | 10/1982 | Gailey et al. | |
| 4,356,217 A | 10/1982 | Wollam et al. | |
| 4,366,197 A | 12/1982 | Hanlon et al. | |
| 4,411,215 A | 10/1983 | Gailey et al. | |
| 4,411,218 A | 10/1983 | Wollam et al. | |
| 4,468,909 A | 9/1984 | Eaton | |
| 4,680,911 A | 7/1987 | Davis et al. | |
| 5,017,320 A | 5/1991 | Velazquez Garcia | |
| 5,053,176 A | 10/1991 | Cameron et al. | |
| 5,126,088 A | 6/1992 | Andres | |
| 5,167,781 A | 12/1992 | Kemerer et al. | |
| 5,232,751 A | 8/1993 | Cameron et al. | |
| 5,244,618 A | 9/1993 | Kemerer et al. | |
| 5,271,200 A | 12/1993 | Witt | |
| 5,305,569 A | 4/1994 | Malmquist et al. | |
| 5,314,325 A | 5/1994 | Bosler | |
| 5,330,341 A | 7/1994 | Kemerer et al. | |
| 5,332,602 A | 7/1994 | Barre et al. | |
| 5,387,381 A | 2/1995 | Saloom | |
| 5,458,477 A | 10/1995 | Kemerer et al. | |
| 5,502,940 A | 4/1996 | Fifield | |
| 5,505,599 A | 4/1996 | Kemerer et al. | |
| 5,553,427 A | 9/1996 | Andres | |
| 5,695,373 A | 12/1997 | Blackmore et al. | |
| 5,700,495 A | 12/1997 | Kemerer et al. | |
| 5,807,514 A * | 9/1998 | Grinshpun et al. | 264/46.6 |
| 5,866,054 A | 2/1999 | Dorchester et al. | |
| 5,866,639 A | 2/1999 | Dorchester et al. | |
| 5,869,176 A | 2/1999 | Dorchester et al. | |
| 5,881,508 A | 3/1999 | Irvine et al. | |
| 5,906,840 A | 5/1999 | Bosler et al. | |
| 5,998,006 A | 12/1999 | Bambara et al. | |
| 6,295,777 B1 | 10/2001 | Hunter et al. | |
| 6,319,456 B1 | 11/2001 | Gilbert et al. | |
| 6,641,384 B2 | 11/2003 | Bosler et al. | |
| 6,698,543 B2 | 3/2004 | Golterman | |
| 6,737,008 B2 | 5/2004 | Gilbert et al. | |
| 6,752,941 B2 | 6/2004 | Hills | |
| 6,823,794 B2 | 11/2004 | Bosler et al. | |
| 7,726,086 B2 | 6/2010 | Kalkanoglu et al. | |
| 8,206,539 B2 | 6/2012 | Kalkanoglu et al. | |
| 2003/0080475 A1 | 5/2003 | Bosler et al. | |
| 2004/0075188 A1 | 4/2004 | Kemerer | |
| 2004/0089978 A1 | 5/2004 | Zimmerman et al. | |
| 2005/0003221 A1* | 1/2005 | Walrath | 428/522 |
| 2005/0053767 A1 | 3/2005 | Franco et al. | |
| 2005/0116373 A1* | 6/2005 | Evans et al. | 264/73 |
| 2005/0127345 A1 | 6/2005 | Giacchino | |
| 2005/0276982 A1 | 12/2005 | Manchee | |
| 2006/0029775 A1 | 2/2006 | MacKinnon et al. | |
| 2006/0053715 A1 | 3/2006 | Mowery | |
| 2006/0053716 A1 | 3/2006 | Mowery | |
| 2006/0078720 A1 | 4/2006 | Toas et al. | |
| 2006/0107550 A1 | 5/2006 | Caminiti | |
| 2008/0066410 A1 | 3/2008 | Dalle Mese et al. | |

FOREIGN PATENT DOCUMENTS

| | | |
|---|---|---|
| JP | 09 111997 A | 4/1997 |
| WO | WO97/04019 | 2/1997 |
| WO | WO98/52996 | 11/1998 |
| WO | WO03/037596 | 5/2003 |
| WO | WO 03/037596 | 5/2003 |

OTHER PUBLICATIONS

CertainTeed, Cedar Boards™, trade literature, Nov. 2005, 14 pgs.
CertainTeed, Product Comparison, trade literature, Jan. 24, 2006, 3 pgs.
Hunter, R.S., "The Measurement of Appearance", 1975, pp. 54-57; 65-80; 218-233, Wiley & Sons, NYC.

* cited by examiner

ROOFING TILE WITH WEATHER DURABLE COLORING MATTER

CROSS REFERENCE TO RELATED APPLICATION

The present application relates to U.S. application Ser. No. 11/671,136 filed Feb. 5, 2007, the entirety of which is incorporated by reference herein.

FIELD OF THE INVENTION

The present invention relates to a synthetic roofing tile that simulates the appearance of a roofing tile made of a natural material.

BACKGROUND

Roofing tiles including shingles have been made from natural materials, including asphalt, wood, slate, quarry tile or a ceramic material, for example. Asphalt shingles require a crushed gravel surface layer to resist erosion due to falling precipitation and water runoff. Pigment on the gravel provide a choice of colors for the asphalt shingles. Tiles made from natural materials tend to be brittle and prone to fracture. Moreover, natural materials, such as, slate and ceramics are heavy, and are unsuitable for use on buildings of light construction or for use in earthquake prone locations. By contrast, synthetic tiles made of a resinous polymeric composition are less brittle and weigh less than slate or ceramics. Chemical additives in the resinous polymeric composition provide desirable properties, such as, flame resistance and weather resistance.

A choice of colors for synthetic tiles can be provided by adding a pigment throughout the resinous polymeric composition. However, the pigment is not required in hidden portions of the tiles. The hidden portions of the tiles reside below the surface, and further where the tiles overlap and cover portions of one another while on a roof. It would be advantageous to conserve pigment consumption by locating the pigment on the tile surface instead of throughout the tile thickness. Further, it would be advantageous to minimize the pigment on the portions of the tiles that are intended to be hidden from view.

A roofing tile made of a natural material has a distinctive coloration pattern that identifies itself as being a particular natural material, for example, a crushed gravel surface layer, wood grain, slate, quarry tile or ceramic material. For example, the natural material has a base color, different shades of the base color, contrasting colors and color streaks. A resinous polymeric roofing composition is required to simulate the appearance of a roofing tile made of a natural material, such as, a crushed gravel surface layer, wood, slate, quarry or ceramic material.

Accordingly, it would be advantageous to provide a resinous polymeric roofing composition with an arrangement of one or more surface colors in a coloration pattern that simulates a distinctive variegated surface coloration pattern of a naturally occurring material.

A roofing tile made from a natural material has naturally occurring surface topography features and surface roughness, which are distinctive of the natural material. It would be advantageous for a synthetic roofing tile to simulate the surface topography features and surface roughness of the natural material by impressing such surface topography features and roughness into a surface of a resinous polymeric roofing composition. Further, it would be advantageous for an arrangement of one or more pigment colors in a variegated surface coloration pattern that register with the surface topography features and surface roughness of a natural material being simulated by the synthetic roofing tile.

US 2006/0029775 A1 discloses a single roofing shingle made by coextruding a capstock layer with a filler material, and then cutting the same into one or more individual shingles. U.S. Pat. No. 3,897,667 discloses casting a foam onto a sheet formed into a panel of shingles in a closed mold wherein closing and opening the mold is performed in a step and repeat process.

U.S. Pat. No. 5,167,781 discloses a foamed plastic material injected into a mold cavity while at an early stage of its foaming action. Foaming is completed in the mold to control finished product density. A separate assembly operation is required to join the foamed plastic material with an outer layer to form a panel. It would be advantageous to eliminate the separate assembly operation by an apparatus capable of bonding the foamed plastic layer with the outer layer while the inner layer is foamed and molded to a desired shape.

U.S. Pat. No. 6,641,384 discloses a belt mold apparatus for continuously molding a polymeric material between a pair of continuous belts, each of which continuously rotates in a loop that circumscribes spaced apart rollers. The pair of belts continuously rotate into positions adjacent each other to form a moving mold between the belts. The polymeric material in a melt state is introduced into a front end of the moving mold. The moving mold shapes the polymeric material therein to form a continuous manufactured article. The moving mold travels from front to rear, accompanying the moving belts. While the belts move rearward and then rotate away from each other, the mold opens, which releases the continuous manufactured article, such that the article withdraws from the moving mold in a rearward direction. The mold includes a vacuum manifold that draws a vacuum on the polymeric material in the mold interior, such that air in the mold interior is evacuated and the polymeric material fills the mold interior and is shaped by a vacuum molding process. Each belt is supported against a flat support belt having apertures through which the vacuum is drawn, such that the vacuum draws the belt against the support belt. A suitable support belt and vacuum manifold are disclosed in U.S. Pat. No. 5,906,840.

Each of U.S. Pat. Nos. 6,319,456 and 6,737,008 discloses a two-layer polymeric building product of continuous length that is formed with visibly aesthetic distinctive surface features on a surface of the two-layer building product by using a moving mold formed between a pair of moving belts. The belts loop around rotating rollers and travel continuously in respective loops to continuously rotate into position beside each other and form the moving mold therebetween. The building product is continuously molded lengthwise with lateral edge portions extending continuously lengthwise. Subsequent to completion of the mold, such lateral edge portions are plastically deformed while still hot, by using a mechanical means to shape a butt edge and a nailing edge, respectively. Further, a punch press is used to mechanically punch a series of apertures laterally through the nailing edge of the building product. Insulation is disclosed as being applied by spraying a foamed polyurethane emulsion.

SUMMARY OF THE INVENTION

A synthetic roofing tile comprises a resinous polymeric precursor of one or more roofing tiles and a weather durable coloring matter on the surface of the precursor, wherein the coloring matter comprises one or more pigment colors arranged in a variegated surface coloration pattern, which simulates the coloration of a naturally occurring material.

The invention advantageously conserves pigment consumption by restricting the weather durable coloring matter to a surface of the precursor instead of being dispersed throughout the precursor material.

A method of making a synthetic roofing tile comprises, extruding a resinous polymeric precursor of one or more roofing tiles, and applying a weather durable coloring matter on a surface of the precursor, wherein the coloring matter comprises one or more pigment colors arranged in a variegated surface coloration pattern, which simulates the coloration of a naturally occurring material. Embodiments of the method comprise either spraying or printing the coloring matter, wherein printing comprises contact printing or non-contact printing.

An embodiment of a synthetic roofing tile comprises a resinous polymeric precursor of one or more roofing tiles, a weather durable coloring matter on the surface of the precursor, wherein the coloring matter comprises one or more pigment colors arranged in a variegated surface coloration pattern, which simulates the coloration of a naturally occurring material, and a surface of the precursor having surface topography features and a surface roughness simulating the surface features of a naturally occurring material.

An embodiment of a method of making a synthetic roofing tile comprises, extruding a resinous polymeric precursor of one or more roofing tiles, spraying the precursor with a weather durable coloring matter of one or more surface colors arranged in a variegated surface coloration pattern, which simulates the coloration of a naturally occurring material, and impressing the precursor surface with surface topography features and surface roughness, which simulate surface features of a naturally occurring material, and locating the surface topography features and the surface roughness in registration with the coloration pattern to simulate the surface features and the coloration of a naturally occurring material.

An embodiment of the invention advantageously registers surface topography features and surface roughness with a variegated surface coloration pattern to simulate the distinctive surface features and the distinctive surface coloration of a naturally occurring material.

Further, it would be advantageous for an embodiment of the invention to minimize the pigment on the portions of the synthetic roofing tiles that are intended to be hidden from view.

DETAILED DESCRIPTION

Figure 1:
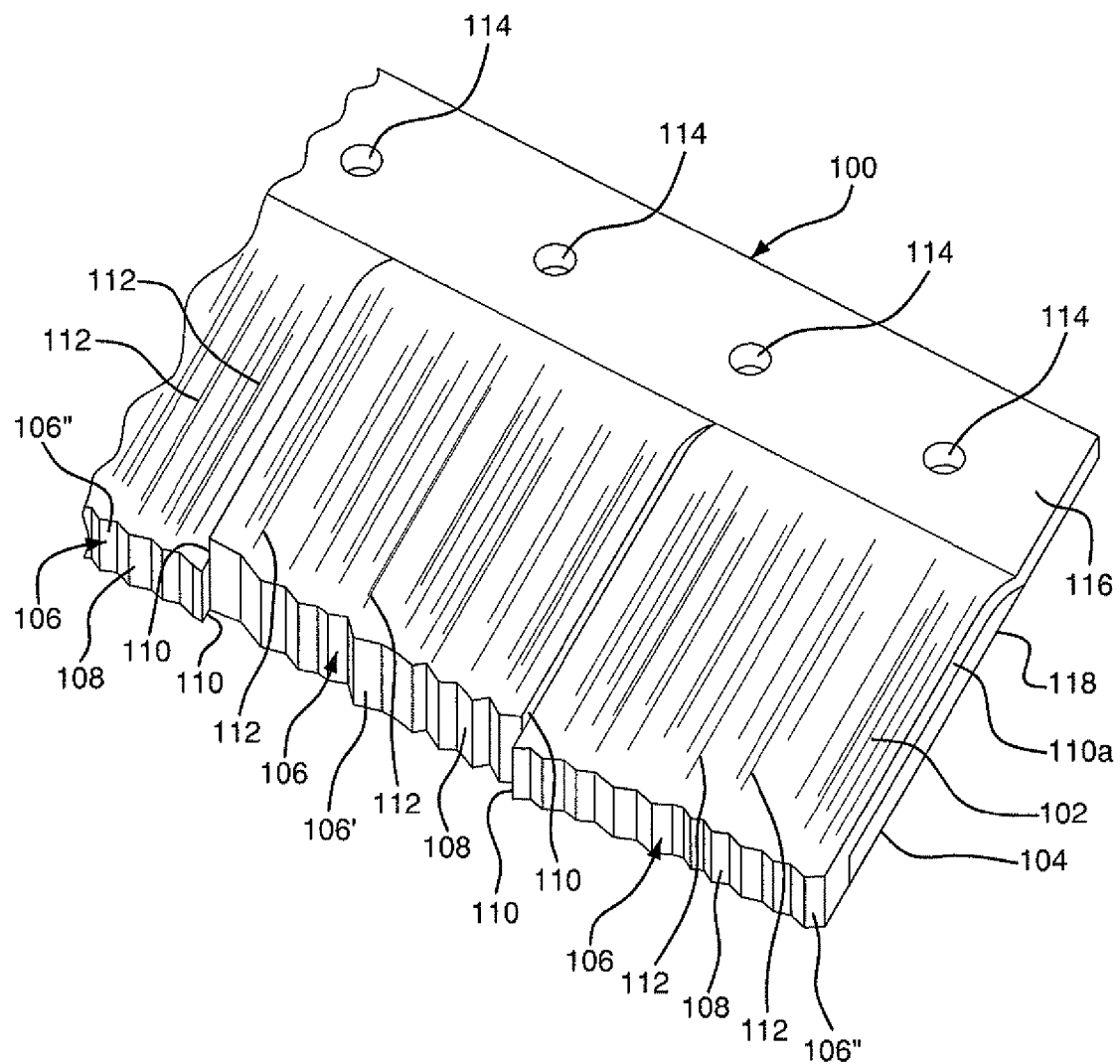
FIG. 1 is an isometric view of an embodiment of a roofing panel.

As disclosed by FIG. 1, an embodiment of a panel 100, a roofing panel, comprises a unitary capstock layer 102 of polymeric material covering and bonded to a shaped, foamed polymeric material forming a unitary foam base layer 104. A continuous length pattern of side-by-side roofing shingles 106 is molded into a lengthwise surface of the unitary capstock layer 102, and a continuous base layer 104 is foamed in situ on the unitary capstock layer 102 such that the pattern of roofing shingles 106 have the thickness and appearance of individual roofing shingles of natural materials. The continuous capstock layer 102 is shaped and formed by vacuum molding into the shape of a plurality of individual roofing shingles 106 side-by-side. The capstock layer 102 is shaped and formed to have butt edges 108 manufactured on respective shingles 106, thereby simulating the butt edges formed on shingles of natural materials, such as, split cedar wood shakes, slate tile, quarry tile, glazed or unglazed ceramic tile, or such other shingles of natural materials found in nature that lend a desired natural appearance to a roof on a building.

The butt edges 108 on the shingles 106 are misaligned with one another side-to side in an embodiment of the invention to simulate randomly arranged shingles of different lengths to correspond with the appearance of cedar shakes or slate tiles. The side edges 110 of the shingles 106 are shaped and formed by vacuum molding to simulate abutting side-by-side edges of individual shingles of natural materials. The side edges 110 comprise unitary selvage edges on the side-by-side shingles 106. Thereby the unitary selvage edges join the shingles 106 such that the shingles 106 are free of open seams that would leak or trap moisture between the shingles 106. Further the side edges 10 are molded at different heights in an embodiment of the invention to simulate randomly arranged shingles of slightly different thicknesses. Thus, a continuous capstock layer 102 is readily formed into various side-by-side shingles 106 differing slightly in appearance from each other to simulate shingles made from natural materials. In FIG. 1, a shingle 106' that is thicker by comparison to a thinner shingle 106", is slightly shorter in length to the butt edge 108 by comparison to the length of the thinner shingle 106" to its butt edge 108. Whether the shingles 106 are thicker or thinner, or longer or shorter, each is formed with substantially the same volume of polymeric material comprising the capstock layer 106. Thereby differently shaped portions of a mold cavity are assured to receive and fill with adequate polymeric material without voids in the polymeric material caused by inadequate filling of the mold cavity. According to another embodiment of the invention, an exemplary shingle 106' has a butt edge 108 comprising a beveled edge that is beveled relative to the substantially flat bottom of the foam base layer 104. The shingle 106' that has a beveled butt edge 108 is adjacent to at least one of the shingles 106" having butt edges 108 that are not beveled. Advantageously, the shingles 106' and 106" are formed by the mold to comprise the same lengths with their respective butt edges 108 side by side. The beveled butt edge 108 give the appearance that individual shingle 106' has a different length than an adjacent shingle 106" even though all the shingles 106' and 106" comprise substantially the same lengths. The cedar shake pattern formed by the mold comprises one or more exemplary shingles 106' having respective beveled butt edges 108. Each beveled butt edge 108 provides a topography of the panel 100 having aesthetically pleasing shadow effects when illuminated, which compares similarly to a jagged appearance of shingle shakes of natural materials having different lengths.

Each of the shingles 106 have surface topography features 112 impressed by vacuum molding to simulate the appearance of shingles of natural materials. A process of molding produces each of the surface topography features 112 capable of being irregular in recessed depth, in projecting height and in area pattern, to appear as randomly shaped or irregular surface topography features, as found in a natural material, compared to a process of extrusion that produces features having straight length dimensions and constant cross sectional dimensions, such as, a straight groove or a straight raised rib. The surface topography features 112 comprise surface peaks and valleys of varied area patterns that simulate those of a natural material, including but not limited to, split cedar wood, slate tile, quarry tile and glazed or unglazed ceramic tile. For example, split cedar wood will have irregular wood grain combined with split-formed surfaces. Slate will have a rough granular surface and irregular patterns of color shades and intensity. Quarry tile and unglazed ceramic tile will have a rough granular surface of low gloss and an even clay color distribution. Glazed tile will have a high temperature fired coating that forms a smooth coating or glaze usually with a high gloss or a matte finish gloss. Quarry tile and ceramic tile are available as a flat plate or a half-round shape. The corresponding surface topography features on the butt edges 108 of the shingles are fabricated to have the appearance of being rough cut, split, quarried, or formed ceramic, to simulate the appearance of shingles of natural materials. The panel 100 of roofing shingles 106 is cut to length by cutting transversely along a cut edge 110a, preferably adjacent to a side edge 110 of a corresponding shingle 106, such that a whole shingle 106 is adjacent to the cut edge 110a.

Each of the shingles 106 is unitary with a nailing edge 116 of the panel 100, and depend laterally from a lengthwise edge of the nailing edge 116. Apertures or recesses 114 extend laterally into the cross section of the nailing edge 116 of the panel 100 for receiving fasteners, such as, nails or screws, not shown, for installing the shingles 106 to make a roof.

An array of one or more roofing panels 100 are assembled in courses that overlap to provide a roof. Each roofing panel 100 in a first of the courses has the nailing edge 116 to secure the panel 100 in place, for example, by nailing the nailing edge 116, to standard roof materials, such as, roof sheathing forming a roof surface or stringers that comprise nailing strips that bridge across roof rafters, roof underlayment usually over roof sheathing, or existing bituminous shingles in need of repair or replacement. Each of further roofing panels 100 one or more thereof in a second of the courses comprises a butt edge 108 overlapping and covering a nailing edge 116 of a corresponding one or more of the roofing panels 100 in the first of the courses. A roof comprises the array of roofing panels 100.

Further, the base layer 104 has a flat planar interior surface 118 to form an underside of a roof. In an embodiment of the roofing panel 100 disclosed by FIG. 1, the foam base layer 104 has a thickness that qualifies as an R-value thickness, when an R-value rated insulation is desired. The polymeric materials of the panel 100 comprises a mixed combination of resinous polymeric materials and additives prior to being extruded. A preferred embodiment contains a flame retardant material additive to avert the danger of spontaneous combustion, especially when the roofing panels 100 are installed directly over bituminous shingles of an existing roof.

The capstock layer 102 comprises a polymeric exterior sheet of a single layer of polymeric material, or comprises a polymeric exterior sheet of multilayer form having two or more polymeric layers, each of which is extruded one over the other, either by coextrusion in a single extruder, or by separate extrusion in a number of successive extruders. The one or more layers comprising the capstock layer 102 are unfoamed and are preferably nonporous and selected to provide a visually aesthetic, finished surface and which comprise polymer compatible additives imparting chemical and mechanical properties required of a roofing panel, for example, water and moisture resistance, flame resistance, ultraviolet resistance, surface texture or finish, colorfast, toughness, wear resistance, impact resistance and stain resistance. In an embodiment of the invention, a top layer of a multilayer form of the capstock layer 102 comprises a translucent or transparent top layer.

The capstock layer 102 covers the base layer 104 that comprises a polymeric foam base layer 104 which is foamed in situ on the capstock layer 102. The foam structure is lightweight for ease in handling. The foam structure has a substantial stiffness and beam thickness to resist force deflection. The foam structure provides a bulk thickness that imitates the thickness of shingles made of natural materials. The foam structure and bulk thickness thereof provides thermal insulation to reduce solar heating. Preferably, the foam comprises a closed cell foam to minimize water collection. Alternatively, the foam comprises an open cell foam that is water repellant and/or the open cell structure is sufficiently small to resist capillary wetting.

An embodiment of the foamed base layer 104 provides a flat surface for flush mounting against a flat surface of a building or to mount directly on underlayment or directly on bituminous shingles in need of repair or replacement.

Further, according to an embodiment of the invention, the capstock layer 102 comprises a polymeric material capable of forming a melt bond with the polymeric material of the inner layer 104. A melt bond is formed at the interface of two, chemically compatible materials, wherein one of the materials comprises a polar ionized composition with a melt phase surface, and the other of the materials in solid phase has a surface, alternatively a partially melted surface, with the capability to form covalent melt bonds with the melt phase surface of the polar ionized composition. The melt phase surface is then solidified to a solid phase to form a solidified melt bond that affixes or retains the two chemically compatible materials.

Figure 2:
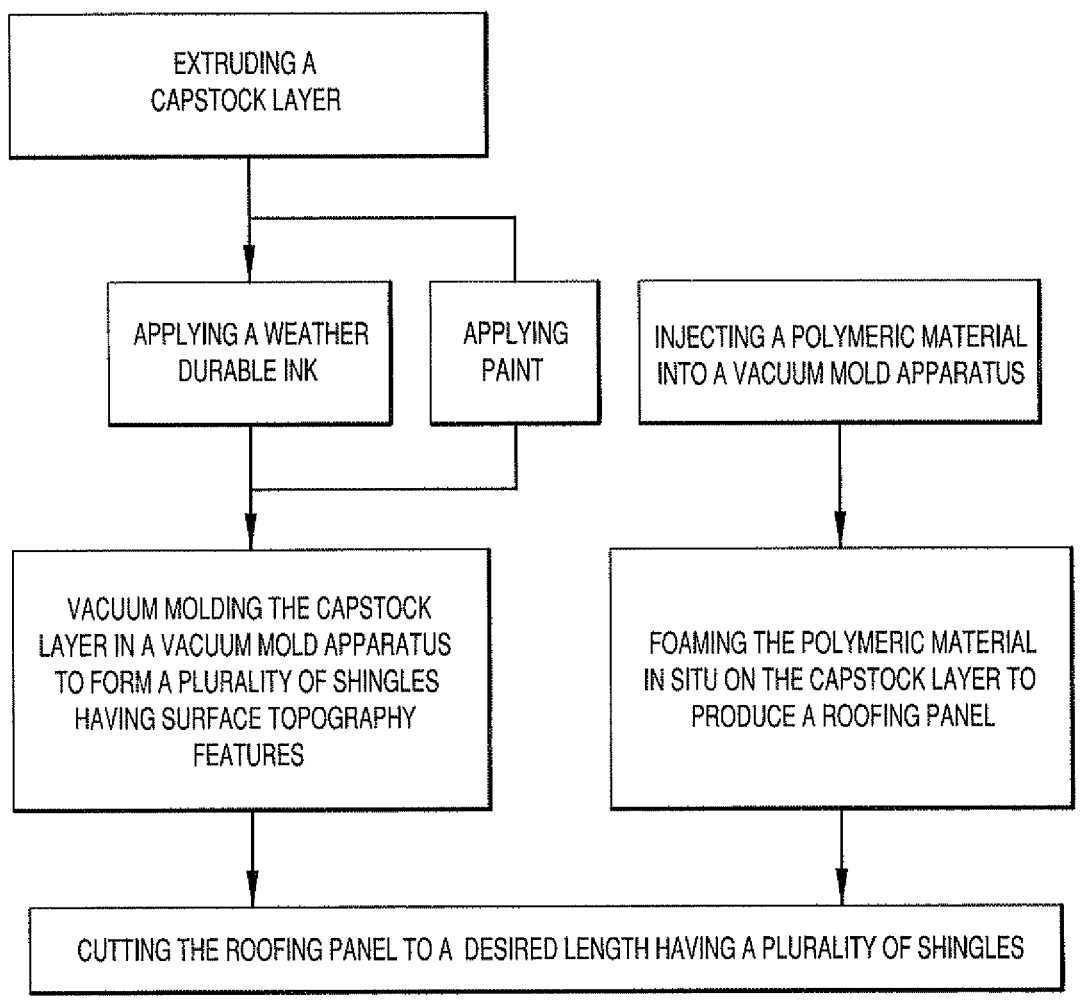
FIG. 2 is a flow diagram of a process by which a roofing panel is manufactured.

FIG. 2 discloses a process by which the panel 100 is manufactured by an embodiment of a mold apparatus disclosed in U.S. patent application Ser. No. 11/671,136, and is further disclosed in FIG. 4 as a schematic embodiment of a mold apparatus 416 having a belt mold for molding the foam layer 104 in situ on the capstock 102. Opposite halves of the belt mold comprise respective moving belts. The pair of belts move in synchronization such that they rotate into positions adjacent each other to close together the mold halves of the moving belt mold. The process comprises, extruding a capstock layer 102 and vacuum molding the capstock layer 102 in a vacuum mold apparatus to form the plurality of shingles 106 having butt edges 108, side edges 110, surface topography features 112 and the nailing edge 116 having the recesses 114. Preferably, a preliminary form or precursor of the butt edge 108 and nailing edge 116 on the capstock layer 102 is produced by extrusion. The process further comprises, injecting a polymeric material into the vacuum mold apparatus and foaming the polymeric material in situ on the capstock layer 102 to produce the roofing panel 100. The process further comprises cutting the roofing panel 100 to a desired length having a plurality of shingles 106 and a cut edge 110a.

In FIG. 2, according to an embodiment of the invention, the process further comprises, applying a weather durable coloring matter on the precursor prior to conveying the precursor to the mold apparatus 416. Separate embodiments of the coloring matter comprise either ink or paint. The coloring matter includes one or more surface colors arranged in a variegated surface coloration pattern, which simulates the distinctive coloration of a naturally occurring material. A weather durable ink embodiment tends to stain and capillary absorb or otherwise penetrate or diffuse into the surface of the precursor material. A paint embodiment tends to coat the surface of the precursor material. The process further comprises impressing surface topography features and surface roughness in the surface of the precursor, by molding in the mold apparatus 416, and locating the surface topography features and the surface roughness in registration with the coloration pattern. An embodiment of the surface topography features and the surface roughness simulates the distinctive surface features of a naturally occurring material. Locating the surface topography features and the surface roughness in registration with the coloration pattern simulates the distinctive surface features and distinctive coloration of a naturally occurring material. The weather durable ink or paint becomes indelible, either prior to, or after, impressing the surface topography features and surface roughness by exposing the ink or paint to the heat that is present in the mold apparatus 416.

Figure 3:
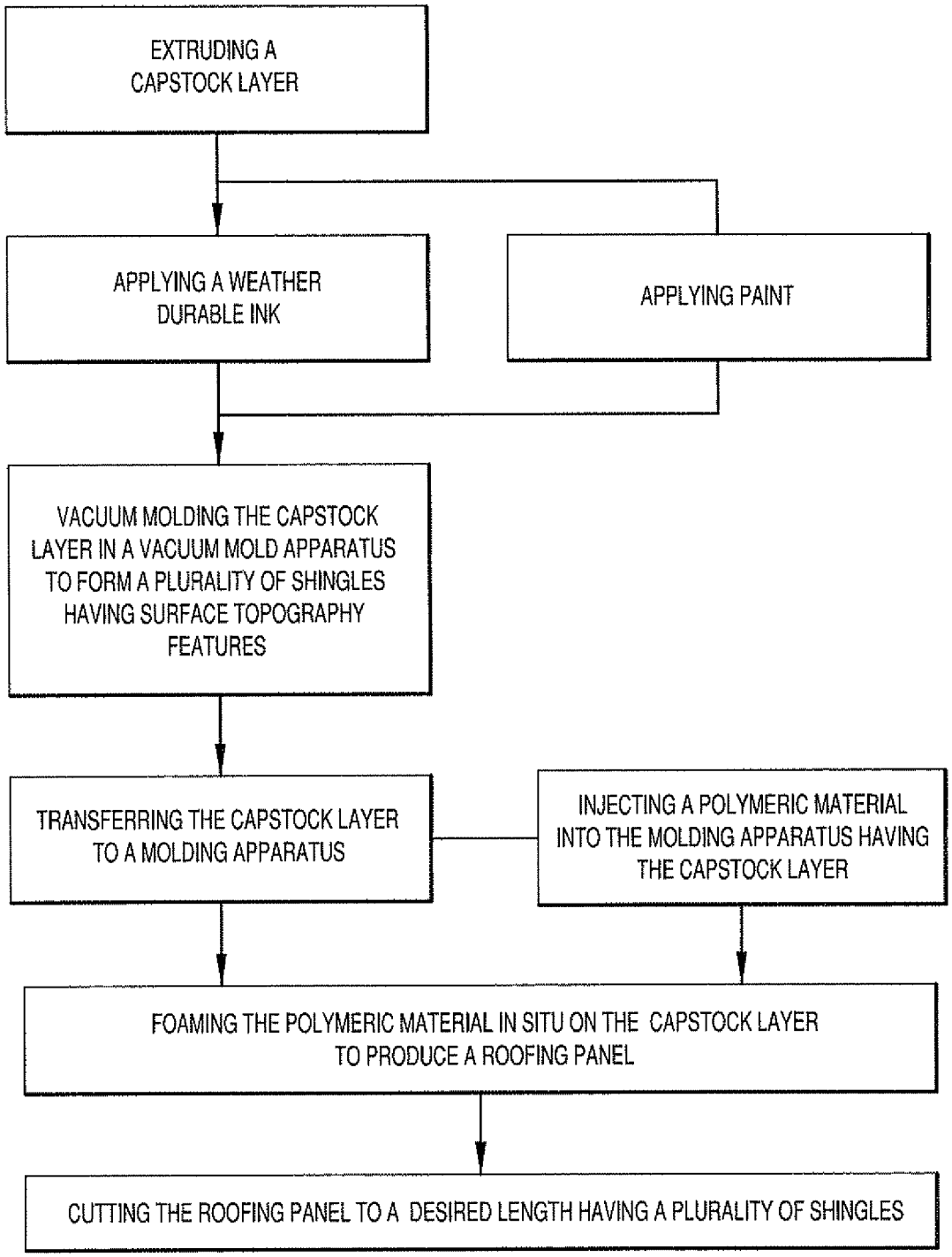
FIG. 3 is a flow diagram of another process by which a roofing panel is manufactured.

FIG. 3 discloses another process by which the panel 100 is manufactured by using another embodiment of a vacuum mold apparatus disclosed in U.S. patent application Ser. No. 11/671,136, and is further disclosed in FIG. 4 as a schematic embodiment of a mold apparatus 416. The process of FIG. 3 comprises, extruding a capstock layer 102 and vacuum molding the capstock layer 102 in the vacuum mold apparatus to form the plurality of shingles 106 having the butt edges 108, side edges 110, surface topography features 112 and the nailing edge 116 having the recesses 114. Preferably, a preliminary form or precursor of the butt edge 108 and nailing edge 116 on the capstock layer 102 is produced by extrusion. The process further comprises transferring the capstock layer 102 to a further molding apparatus, and injecting the polymeric material of the base layer 104 into the further molding apparatus having the capstock layer 102. The process further comprises foaming the polymeric material in situ on the capstock layer 102 in the further molding apparatus to produce the roofing panel 100. The process further comprises cutting the roofing panel 100 to desired length having a plurality of shingles 106 and a cut edge 110a.

In FIG. 3, according to an embodiment of the invention, the process further comprises, applying a weather durable coloring matter on the precursor prior to conveying the precursor to the mold apparatus 416. Separate embodiments of the coloring matter comprise ink or paint. The coloring matter includes one or more surface colors arranged in a variegated coloration pattern, which simulates the distinctive coloration of a naturally occurring material. The process further comprises impressing surface topography features and surface roughness in the surface of the precursor, by molding in the mold apparatus 416, and locating the surface topography features and the surface roughness in registration with the coloration pattern. An embodiment of the surface topography features and the surface roughness simulate the distinctive surface features of a naturally occurring material. Locating the surface topography features and the surface roughness in registration with the coloration pattern simulates the distinctive surface features and distinctive coloration of a naturally occurring material. The weather durable ink or paint becomes indelible, either prior to, or after, impressing the surface topography features and surface roughness by exposing the ink or paint to the heat that is present in the mold apparatus 416.

Preferably, the extrusion process of each of FIGS. 2 and 3 produces a preliminary form or precursor of the butt edge 108 and nailing edge 116 on the capstock layer 102. According to an embodiment of the invention, the capstock layer 102 is extruded as a layer having a cross section of constant thickness throughout. According to another embodiment, the capstock layer 102 is extruded with a cross section of varied thickness, wherein a thicker cross section is provided where needed to fill the mold cavity that has a greater volume to be filled with the capstock layer 102. According to another embodiment, the extruded capstock layer has an L-shaped cross section in which the long side of the L-shaped cross section forms the precursor of the shingles 106 and the short side of the L-shaped cross section forms a precursor of the butt edges 108 of the shingles 106. The molding apparatus and molding process described in each of FIGS. 2 and 3 comprise a continuous molding operation, and specifically a vacuum molding operation. Further embodiments of a molding apparatus and a molding process comprise compression molding wherein molding is performed in a closed mold, for example, as disclosed by US 2006/0029775 A1 and U.S. Pat. No. 3,897,667, and wherein closing and opening the mold is performed in a step and repeat process according to a batch molding operation.

Figure 4:
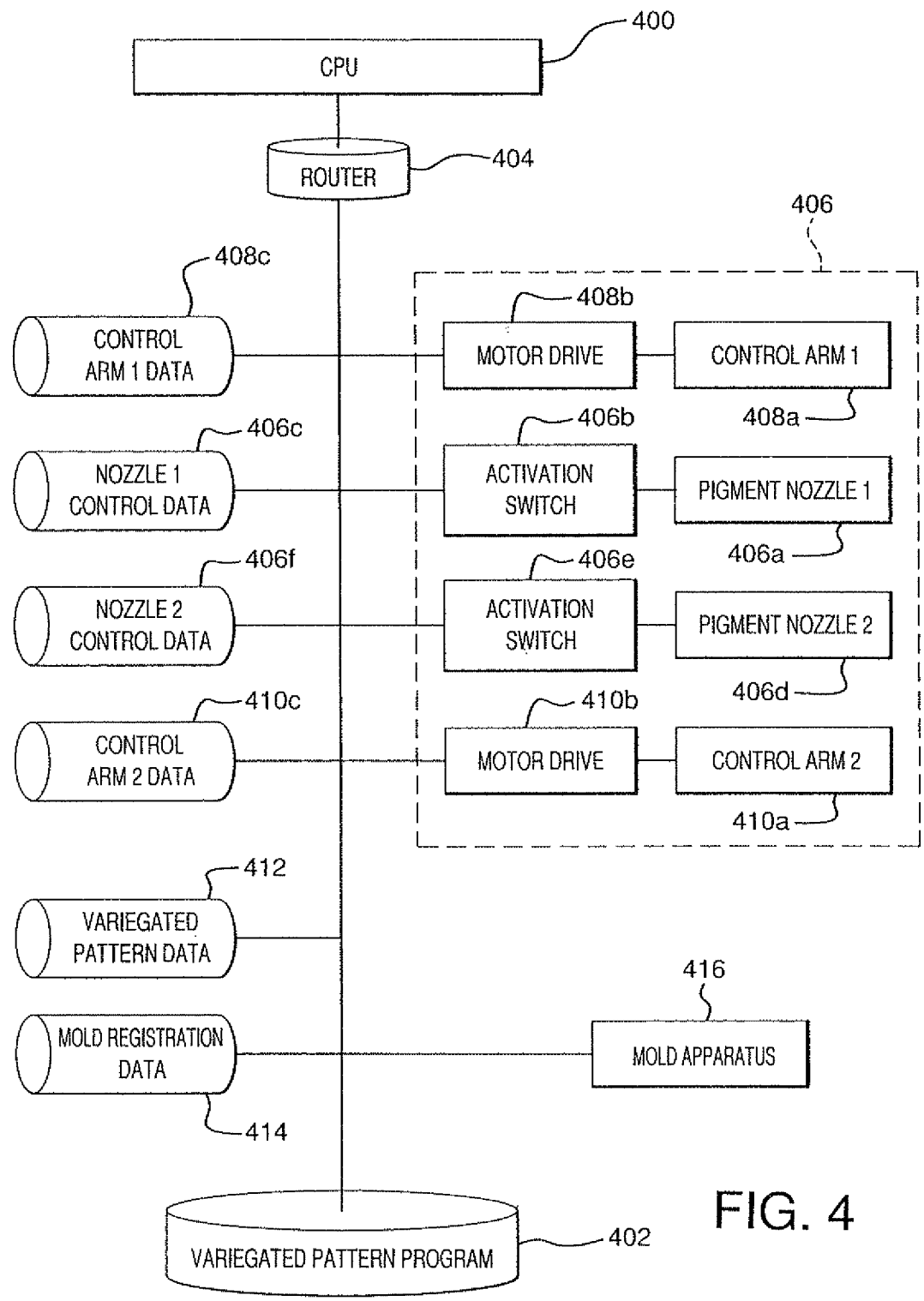
FIG. 4 is a schematic diagram of a router-based manufacturing process control system.

FIG. 4 discloses an embodiment of a router-based manufacturing process control system, PCS, for spraying weather durable ink or paint on the precursor capstock layer 102. Alternative embodiments of the PCS are of similar construction and operation by using network integration or a dedicated microprocessor chip integration to displace a need for a router. A central processor unit, CPU, 400 of a computer receives and processes computer software logic generated commands sent through a router 404 from a computer software program, a variegated pattern program 402. The program 402 is written, constructed and arranged to direct and control the CPU 400 in performance of the following operations. The program 402 commands the CPU 400 through the router 404 to store data in memory storage devices of a computer having the CPU 400 and the router 404. Variegated pattern data 412 are stored, as shown, in a memory storage device. The variegated pattern data comprises map data of high resolution digital byte measurements recorded, for example, by scanned arrays of high resolution digital camera images of a surface of a tile or tiles, or a sample blank thereof, made of a natural material. Certain byte measurements of the map data comprise one or more digitally generated and recorded surface colors and high resolution digital byte measurements of a variegated pattern distribution of such a color or colors that is distinctive of the natural material. The map data is used to spray a weather durable ink or paint to simulate the variegated distribution of a color or colors of the natural material. Other byte measurements of the map data comprises high resolution digital byte measurements of valleys and peaks of surface topography features and surface roughness distinctive of the natural material. The map data provides a pattern of surface topography features and surface roughness that is used to fabricate a mold impression surface of the mold apparatus 416. The surface topography features and the surface roughness are built into the surface of the mold impression surface, by following the pattern. During a molding operation performed by the mold apparatus 416, the mold impression surface transfers the surface topography features and surface roughness to the precursor of the capstock layer 102.

Further, the digital byte measurements of the surface topography features and surface roughness are correlated to the digital byte measurements of the locations of the color or colors in the variegated pattern distribution. The program 402 commands the CPU 400 through the router 404 to generate a simulation of the surface features and the surface coloration of a tile made from a natural material.

The CPU 400 receives and processes the commands, and generates and sends digital encoded operation commands through the router 404 to operate a spraying apparatus 406 to spray or apply one or more colors on selected areas of the panel 100 or each shingle 106 to simulate the coloration of the natural material.

In FIG. 4, the spraying apparatus 406 comprises one or more pigment nozzles 406a, 406d, disclosed as pigment nozzle 1 and pigment nozzle 2 on respective control arms 408a and 410a. Each of the nozzles 406a, 406d dispenses small droplets of weather durable ink or paint entrained in compressed air. The ink or paint is driven through the nozzles 406a, 406d by compressed air from a known air compressor apparatus, not shown. Alternatively, the pigment nozzles comprise airless spray nozzles of a known airless spraying device. Each of the nozzles 1 and 2 is activated by a corresponding on-off activation switch 406b, 406e to dispense the ink or paint or turn off the ink or paint. An alternative embodiment of the spraying apparatus 406 comprises one or more ink or paint jet printing heads in which the ink or paint is dispensed by on-off electronic pulses instead of by air pressure, and the ink or paint jet printing heads traverse along respective carriage tracks or carriage rails.

In FIG. 4, the activation switch 406b is turned on or off according to the following process. The variegated pattern program 402 commands the CPU through the router 404 to retrieve variegated pattern data 412 stored, as shown, in a memory storage device of a computer having the CPU 400 and the router 404 or having the equivalent thereof. The variegated pattern program 402 commands the CPU through the router 404 to retrieve nozzle 1 control data 406c stored, as shown, in a memory storage device of the computer. The CPU 400 processes the nozzle 1 data 406c and the variegated pattern data 412, and produces and sends digital encoded on-off commands through the router 402 to turn the activation switch 406b on or off, under the direction and control of the variegated pattern program 402.

In FIG. 4, the activation switch 406e is turned on or off according to the following process. The variegated pattern program 402 commands the CPU through the router 404 to retrieve variegated pattern data 412 stored, as shown, in a memory storage device of the computer. It should be understood that retrieval of the variegated pattern data 412 may occur either once or repeatedly during a single manufacturing cycle. The variegated pattern program 402 commands the CPU through the router 404 to retrieve nozzle 2 control data 406f stored, as shown, in a memory storage device of the computer. The CPU 400 receives and processes the nozzle 2 control data 406f and the variegated pattern data 412, and produces and sends digital encoded on-off commands through the router 402 to turn the activation switch 406e on or off, under the direction and control of the variegated pattern program 402.

In FIG. 4, the nozzles 406a, 406d are mounted on respective control arms 408a, 410a disclosed as control arm 1 and control arm 2. Each of the control arms 408a, 410a is moved to reach from point-to-point by one or more reversible motor drives 408b, 410b, which displaces respective nozzles 406a, 406d along respective paths from point-to-point, while the nozzles spray the one or more colors of weather durable ink or paint under the direction and control of the variegated pattern program 402. The control arms 408a, 410a are positioned in the manufacturing assembly line to avoid interfering with one another when moved. The variegated pattern program 402 commands the CPU 400 through the router 404 to retrieve variegated pattern data 412 stored in a memory storage device of the computer. The variegated pattern program 402 commands the CPU through the router 404 to retrieve control arm 1 data 408c stored, as shown, in a memory storage device of the computer. The CPU 400 receives and processes the control arm 1 data 408c and the variegated pattern data 412, and generates and sends digital encoded operation commands through the router 404 to the one or more motor drives 408b. The control arm 408a is moved from point-to-point by the one or more reversible motor drives 408b under the direction and control of the variegated pattern program 402.

The variegated pattern program 402 commands the CPU through the router 404 to retrieve variegated pattern data 412 stored in a memory storage device of the computer. The variegated pattern program 402 commands the CPU through the router 404 to retrieve control arm 2 data 410c stored in a memory storage device of the computer. The CPU 400 receives and processes the control arm 2 data 410c and the variegated pattern data 412, and generates and sends digital encoded operation commands through the router 404 to the one or more motor drives 410b. The control arm 410a is moved to reach from point-to-point by the one or more, reversible motor drives 410b under the direction and control of the variegated pattern program 402.

In FIG. 4, each of the control arms 408a, 410a is moveable to reach from point-to-point, as defined by X-Y coordinates or polar coordinates of the mapping data portions of the variegated pattern data, to move the corresponding nozzles 406a, 406d while spraying the precursor of the capstock layer 102 with weather durable ink or paint of one or more surface colors, such that the one or more colors are arranged in a variegated surface coloration pattern, which corresponds with the variegated pattern data 412 of a digitally recorded variegated surface coloration pattern of one or more colors present on samples or blanks of actual tile or tiles made of a natural material. In a continuous manufacturing process, the precursor of the capstock layer 102 continuously moves along the X-axis of an X-Y coordinate system, such that, the respective control arms 408a, 410a incur substantial Y-axis movements and minimize the X-axis movements. The precursor is cut to length to provide at least one individual synthetic roofing tile 106, or alternatively, the precursor is cut to length to form a panel 100 having a plurality of synthetic roofing tiles 106. In a manufacturing batch process, the precursor of the capstock layer 102 moves in a step and repeat process, for example, according to U.S. Pat. No. 3,897,667. According to a batch process, either an X-Y coordinate system or a polar coordinate system is available for movement of the respective control arms 408a, 410a to coordinate with the batch process. In a step and repeat manufacturing system the precursor workpiece is stationary or is in motion. Similarly, the nozzles 406a, 406d while spraying the precursor moves in registration with, or in synchronization with, the workpiece or is stationary to correspond with a stationary workpiece. The nozzles 406a, 406d comprise an example of a non-contact printer or spraying apparatus. Examples of a contact printer comprise a gravure printer or intaglio printer in place of the nozzles 406a, 406d.

The map data comprising the measurements of valleys and peaks of surface topography features and surface roughness are used as a pattern to construct the mold surface of the mold apparatus 416 with the surface topography features and surface roughness that are to be impressed into the surface of the precursor of the capstock layer 102 during a molding operation performed by the molding apparatus 416. In FIG. 4, the variegated pattern program 402 commands the CPU 400 through the router 404 to retrieve mold registration data 414 stored, as shown, in a memory storage device, and to correlate the mold registration data 414 with the variegated pattern data 412. The mold registration data 414 is obtained by measurements taken of the mold apparatus 416, and particularly, measurements where the surface topography features and the surface roughness are located on the mold apparatus 416. The CPU 400 processes the variegated pattern data 412 and the mold registration data 414 to generate and supply digital encoded operation commands, input on-off commands, to start the mold apparatus 416 in coordination with the variegated pattern data, such that the mold apparatus 416 locates the surface topography features and the surface roughness in correlation with or registration with the coloration pattern while impressing the surface topography features and surface roughness in the surface of the precursor for one or more tiles 106.

In a continuous molding process, the CPU 400 processes the variegated pattern data 412 and the mold registration data 414 to generate and supply digital encoded operation commands, input, speed control commands to the mold apparatus 416 for the mold apparatus 416 to adjust the speed of operation thereof in correlation with or registration with the coloration pattern while impressing the surface topography features and surface roughness in the surface of the precursor.

An embodiment of the surface topography features and the surface roughness simulate the distinctive surface features of a naturally occurring material. Locating the surface topography features and the surface roughness in correlation with or in registration with the coloration pattern simulates the distinctive surface features and distinctive coloration of a naturally occurring material.

The memory storage devices 406c, 406f, 408c, 410c, 412 and 414 are either separate or are combined in a single memory storage device, or are in separate partitions of a single memory storage device, or are in one or more memory storage devices, which may or may not be partitioned.

The invention advantageously conserves pigment consumption by restricting the weather durable ink or paint to a surface of the precursor instead of being dispersed throughout the precursor material.

An embodiment of the invention advantageously registers or correlates surface topography features and surface roughness with a variegated surface coloration pattern to simulate the distinctive surface features and distinctive coloration of a naturally occurring material.

Each publication referred to herein is hereby incorporated by reference herein in its entirety.

This description of the exemplary embodiments is intended to be read in connection with the accompanying drawings, which are to be considered part of the entire written description. In the description, relative terms such as "lower," "upper," "horizontal," "vertical", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the invention has been described in terms of exemplary embodiments, it is not limited thereto, Rather, the appended claims should be construed broadly, to include other variants and embodiments of the invention, which may be made by those skilled in the art without departing from the scope and range of equivalents of the invention.

What is claimed is:

1. A method of making a roofing tile, comprising:
    extruding a precursor of a capstock layer;
    providing said precursor of a capstock layer with an extruded roofing tile profile having a butt edge, a single nailing edge and substantially planar top and bottom surfaces;
    applying weather durable coloring matter comprising ink or paint in a predetermined coloration pattern onto at least said top surface of said precursor of a capstock layer, vacuum molding an impression into at least said top surface of said precursor of a capstock layer;
    applying a base layer on the precursor of the capstock layer, the base layer adapted to form a flat planar interior surface; and
    cutting a plurality of side edges into the extruded roofing tile profile of the precursor of a capstock layer and the base layer to form separate shingles attached to the single nailing edge, wherein a first shingle is thicker and shorter in length to the butt edge than a second shingle, wherein each shingle is formed with substantially the same volume of polymeric material,
    wherein the butt edge has a topography to provide a jagged appearance.

2. A method of making a synthetic roofing material precursor simulating a natural material, comprising:
    extruding a resinous polymeric precursor of a polymeric exterior sheet;
    providing the precursor with an extruded roofing tile profile having a butt edge, a single nailing edge and substantially planar top and bottom surfaces;
    applying a weather durable coloring matter on a surface of the precursor;
    vacuum molding an impression into at least said top surface of said precursor;
    foaming a polymeric material on the precursor to form a base layer, the base layer having a flat planar surface to form an underside of a roof; and
    cutting a plurality of side edges into the polymeric exterior sheet to form separate shingles attached to the single nailing edge, wherein a first shingle is thicker and shorter in length to the butt edge than a second shingle, wherein each shingle is formed with substantially the same volume of polymeric material,
    wherein the butt edge has a topography to provide a jagged appearance.

3. The method of claim 2, further comprising:
    extruding the precursor as a continuous length comprising the polymeric exterior sheet for one or more synthetic roofing tiles.

4. The method of claim 2, further comprising:
    storing variegated pattern data in a computer memory device wherein the variegated pattern data comprises a digitally recorded variegated surface coloration pattern of the one or more colors present on a tile made of a natural material;

retrieving and processing the variegated pattern data by a computer central processor unit; and generating digital encoded operation commands to a manufacturing apparatus to perform applying the weather durable coloring matter in the form of ink or paint on a surface of the precursor according to the variegated surface coloration pattern.

5. The method of claim 2, further comprising:

impressing a surface of the precursor with surface topography features and surface roughness, which simulate surface features of a naturally occurring material; and locating the surface topography features and the surface roughness in correlation with the variegated surface coloration pattern to simulate the surface features and the coloration of a naturally occurring material.

6. The method of claim 2, wherein the step of applying the weather durable coloring matter is selected from spraying, contact printing or non-contact printing.

7. The method of claim 2, wherein the step of applying the weather durable coloring matter comprises applying the weather durable coloring matter to a portion of the surface of the precursor.

8. The method of claim 2, further comprising:

storing variegated pattern data in a computer memory device wherein the variegated pattern data comprises a digitally recorded variegated surface coloration pattern of the one or more colors present on a tile made of a natural material;

retrieving and processing the variegated pattern data by a computer central processor unit;

generating digital encoded operation commands to a manufacturing apparatus to apply the weather durable coloring matter on a surface of the precursor according to the variegated surface coloration pattern; and locating the surface topography features and the surface roughness in registration with the variegated surface coloration pattern to simulate the distinctive surface features and the distinctive coloration of a naturally occurring material.

9. The method of claim 8, further comprising:

retrieving mold registration data from a memory storage device and correlating the mold registration data with the variegated pattern data; and generating digital encoded operation commands to a mold apparatus to locate the surface topography features and the surface roughness in registration with the variegated surface coloration pattern.

10. The method of claim 1, further comprising:

retrieving mold registration data from a memory storage device and correlating the mold registration data with the variegated pattern data;

generating digital encoded operation commands to a mold apparatus to locate surface topography features and surface roughness in registration with the variegated surface coloration pattern; and locating the surface topography features and the surface roughness in registration with the variegated surface coloration pattern.

11. A method of making a synthetic roofing tile, comprising:

extruding a precursor of an exterior polymeric sheet;

providing said precursor of the exterior polymeric sheet with an extruded roofing tile profile having a butt edge, a single nailing edge and substantially planar top and bottom surfaces commanding a CPU to retrieve variegated pattern data stored in a computer memory device;

processing the variegated pattern data;

generating and sending digital encoded commands to a manufacturing apparatus to apply a weather durable coloring matter on a surface of the precursor;

vacuum molding an impression into at least said top surface of said precursor of a capstock layer;

applying a base layer on the precursor of a capstock layer, the base layer adapted to form a melt bond with the precursor of a capstock layer; and cutting a plurality of side edges into the exterior polymeric sheet and the base layer to form separate shingles attached to the single nailing edge, wherein a first shingle is thicker and shorter in length to the butt edge than a second shingle, wherein each shingle is formed with substantially the same volume of polymeric material, wherein the butt edge has a topography to provide a jagged appearance.

12. The method of claim 11, further comprising:

commanding the CPU to retrieve mold registration data stored in a corresponding computer memory device; and correlating the mold registration data and the variegated pattern data, and generating and sending digital encoded commands to a mold apparatus to locate the surface topography features and the surface roughness in registration with the variegated surface coloration pattern to simulate the distinctive surface features and the distinctive coloration of a naturally occurring material.

* * * * *